(12) United States Patent
Andronaco (10) Patent No.: US 12,297,938 B2
(45) Date of Patent: May 13, 2025

(54) CONDUIT COUPLER FOR COUPLING STUB END CONDUITS

(71) Applicant: Ethylene, LLC, Kentwood, MI (US)

(72) Inventor: Ronald V. Andronaco, Alto, MI (US)

(73) Assignee: Ethylene, LLC, Kentwood, MI (US)

( * ) Notice: Subject to any disclaimer, the term of this patent is extended or adjusted under 35 U.S.C. 154(b) by 372 days.

(21) Appl. No.: 17/806,087

(22) Filed: Jun. 9, 2022

(65) Prior Publication Data

US 2022/0403961 A1    Dec. 22, 2022

Related U.S. Application Data

(60) Provisional application No. 63/202,586, filed on Jun. 17, 2021.

(51) Int. Cl.
| | |
|---|---|
| *F16L 23/00* | (2006.01) |
| *F16L 21/06* | (2006.01) |
| *F16L 23/08* | (2006.01) |

(52) U.S. Cl.
CPC ........... *F16L 23/003* (2013.01); *F16L 21/065* (2013.01); *F16L 23/08* (2013.01)

(58) Field of Classification Search
CPC ....... F16L 23/003; F16L 23/08; F16L 21/065; F16L 9/147; F16L 13/02; F16L 25/12; F16L 47/02
See application file for complete search history.

(56) References Cited

U.S. PATENT DOCUMENTS

| | | | |
|---|---|---|---|
| 1,920,449 A | 8/1933 | Unke | |
| 2,739,829 A | 3/1956 | Cundiff | |
| 3,061,503 A | 10/1962 | Gould et al. | |
| 3,508,766 A | 4/1970 | Berg | |
| 3,961,814 A | 6/1976 | Byrne et al. | |
| 4,274,662 A | 6/1981 | de Groot et al. | |
| 4,652,019 A | 3/1987 | von Ahrens | |
| 4,865,356 A * | 9/1989 | Moore | E21B 17/085 |
| | | | 285/55 |
| 4,865,674 A | 9/1989 | Durkin | |
| 5,364,130 A | 11/1994 | Thalmann | |
| 5,462,314 A | 10/1995 | Goto | |

(Continued)

FOREIGN PATENT DOCUMENTS

| | | |
|---|---|---|
| DE | 3720577 A1 | 2/1988 |
| DE | 3926662 A1 | 2/1991 |

*Primary Examiner* — James M Hewitt, II
(74) *Attorney, Agent, or Firm* — HONIGMAN LLP (57) ABSTRACT

A conduit joint system securing ends of two conduits together includes first and second conduits having first and second flared ends and first and second liners protruding from the flared ends. The liners are joined together so that the flared ends are opposing and spaced from one another and portions of the liners are between the flared ends. An external coupler is configured to receive the flared ends and includes (i) a first flange receiving portion configured to receive the first flared end, (ii) a second flange receiving portion configured to receive the second flared end, and (iii) a body portion extending between the flange receiving portions and configured to receive the portions of the liners between the flared ends. With the liners joined together and with the external coupler receiving the flared ends, and the portions of the liners, the external coupler secures the first and second conduits together.

19 Claims, 11 Drawing Sheets

(56) References Cited

U.S. PATENT DOCUMENTS

| | | | |
|---|---|---|---|
| 5,505,497 A * | 4/1996 | Shea | F16L 21/06 |
| | | | 285/55 |
| 5,566,984 A | 10/1996 | Abbema | |
| 5,961,154 A * | 10/1999 | Williams | F16L 13/10 |
| | | | 156/92 |
| 6,086,109 A * | 7/2000 | Esser | F16L 23/04 |
| | | | 285/55 |
| 6,131,954 A | 10/2000 | Campbell | |
| 6,595,559 B1 | 7/2003 | Readman | |
| 11,231,136 B2 | 1/2022 | Andronaco et al. | |
| 11,815,208 B2 * | 11/2023 | Bertolotti | F16L 33/2078 |
| 2011/0042096 A1 | 2/2011 | Nutley | |
| 2012/0280488 A1 | 11/2012 | Pionetti | |
| 2013/0114945 A1 | 5/2013 | Pionetti et al. | |
| 2021/0025522 A1 * | 1/2021 | Andronaco | F16L 13/0227 |

\* cited by examiner

CONDUIT COUPLER FOR COUPLING STUB END CONDUITS

CROSS REFERENCE TO RELATED APPLICATION

The present application claims the filing benefits of U.S. provisional application Ser. No. 63/202,586, filed Jun. 17, 2021, which is hereby incorporated herein by reference in its entirety.

FIELD OF THE INVENTION

The present invention relates generally to hoses and pipes and conduits and, more particularly to industrial hoses/pipes/conduits that are joined together at coupling joints.

BACKGROUND OF THE INVENTION

Typically, composite or metallic hoses or pipes are joined together at their ends via flanges that are formed or established at the ends of adjacent hoses or pipes and that are bolted together to secure the two hoses or pipes together to form a longer length of hose or pipe for conveying liquid or gas materials from one location to another (such as between valves and/or pumps or the like).

SUMMARY OF THE INVENTION

A conduit joint or joint system joins opposing ends of two metal conduits together, each metal conduit having a flared end and a liner (such as a polymeric liner) protruding from the flared end of the metal conduit. The liners from opposing conduits are joined so that the flared ends of opposing conduits are opposing and spaced apart from one another. The conduit joint includes an external coupler (such as a metallic coupler) that is configured to receive the opposing flared ends spaced apart from one another and the portions of the joined first and second liners between the respective flared ends. With the opposing liners joined together and with the external coupler receiving and retaining the opposing and spaced apart flared ends, the opposing conduits are fixedly joined together.

The external coupler may include a pair of coupler portions configured to be joined together to retain the flared ends of the conduits in their spaced apart relationship. For example, the external coupler may include two halves that are each configured to receive and retain half of each conduit and flared end. Each coupler portion thus includes a first flange receiving portion configured to receive a first flared end of one of the conduits to be joined or coupled, a second flange receiving portion configured to receive a second flared end of the other conduit to be joined or coupled, and a body portion configured to receive portions of first and second liners between the first and second flared ends. The body portions of the two coupler portions may be fastened together (such as via threaded fasteners or other suitable fastening means) to secure the external coupler at the two conduits.

These and other objects, advantages, purposes and features of the present invention will become apparent upon review of the following specification in conjunction with the drawings.

DESCRIPTION OF THE PREFERRED EMBODIMENTS

Referring now to the drawings and the illustrative embodiments depicted therein, a conduit joint 10 joins two lined metallic pipes or tubes or conduits 11, 12 (FIGS. 1-5). The lined metallic (e.g., steel or other suitable metal material) pipes or tubes or conduits 11, 12 are lined, such as with a polymeric liner 14, 16. The liner 14, 16 extends or protrudes from a flared end of the conduit 11, 12. The flared end of the conduit includes a flange or stub end or flared portion 18, 20 that is substantially normal to and circumscribing the end of the respective conduit 11, 12. The liners 14, 16 of the conduits 11, 12 are joined or fused to one another, such as via an internal polymeric coupler 22 (such as a coupler or fused joint utilizing aspects of the couplers and fused joints described in U.S. Pub. No. 2021/0025522, which is hereby incorporated by reference herein in its entirety).

With the first and second liners 14, 16 joined or fused together, the first and second flared ends 18, 20 of the conduits 11, 12 are opposing and spaced apart from one another. An external metallic coupler or coupler assembly 24 receives and retains the flared ends 18, 20 of the respective conduits 11, 12, and the portions of the first and second liners 14, 16 are disposed between the flared ends 18, 20 to form the conduit joint 10 and secure the opposing ends of the two conduits together. The external metallic coupler secures the ends between two portions or halves 26a, 26b of the coupler assembly 24 to maintain the joint 10 between the conduits and polymeric liners, which may otherwise separate or break, such as due to external forces on the conduit and/or joint and/or pressure of fluid travelling within the conduits and polymeric liners.

The liners of the conduits may include any suitable material, such as, for example, a fluorinated ethylene propylene (FEP) or polytetrafluoroethylene (PTFE) liner. The conduit joint and metallic coupler may be compatible with lined pipes or tubes or conduits (such as FEP PTFE lined conduits) and any other type of pipe or tube or conduit, such as composite pipes or tubes or the like.

The conduits 11, 12 have flared or stub ends 18, 20 which may be welded on to the metal ends of the conduits or cold formed at the ends (such as via use of a FLANGEX™ flanging machine that cold forms the stub end at the pipe without use of welding). Optionally, the conduit joint may be configured to accommodate other types of conduits, such as those with flanged ends (of varying configurations and shapes) or any other suitable protrusion from the outer surface of the conduit and circumscribing an opening of the conduit.

To form the conduit joint between the conduits, the liners of the respective conduits are joined or fused together, as will be discussed below, so that the metal flared ends or stub ends of the conduits (at the respective ends of the conduits to be joined) are opposing and spaced apart from one another, with at least a portion of each liner exposed exterior the metallic structure of the conduit and between the respective flared ends. Because the joined/fused portions of the liners are exposed between the metallic structures of the conduits, the exposed portions of the joined liners are susceptible to rupture, bending, and other damage due to forces and the environment surrounding the conduits and/or the pressure of contents travelling along and through the conduits. Thus, the addition of an exterior metallic coupler receiving the flared ends of the respective conduits and surrounding the liner joint provides a conduit joint that protects and supports the exposed liners from rupture, bending or other damage and provides a secure connection for the joined liners and spaced apart metallic conduits.

As shown in FIGS. 1-5, the conduit joint 10 joining the opposing ends of the first and second conduits 11, 12 includes the first and second liners 14, 16 joined/fused together so that the first and second flared ends 18, 20 are opposing and spaced apart from one another and portions of the first and second liners 14, 16 are between the first and second flared ends. The metallic coupler 24 includes two coupler portions 26a, 26b (such as two symmetrical halves) that, when attached together at the joint, circumscribe the flared ends of the conduits and the joined/fused liners protruding from the flared ends of the conduits. Each portion or half 26a, 26b of the external metallic coupler 24 is configured to receive the first and second flared ends that are opposing and spaced apart from one another and the portions of the first and second liners that are between the first and second flared ends. The external metallic coupler includes first and second flange receiving portions 28, 30 that are configured to receive the respective first and second flared ends 18, 20 of the conduits. The external metallic coupler also includes a body portion 32 configured to receive and/or circumscribe the portions of the first and second liners 14, 16 between the first and second flared ends 18, 20. Thus, with the first and second liners joined/fused together and with the external metallic coupler receiving the first flared end, the second flared end and the portions of the first and second liners between the respective first and second flared ends, the external metallic coupler secures the first and second conduits together.

As shown in FIGS. 1-10, the first and second flange receiving portions 28, 30 of each portion or part or half of the external metallic coupler are spaced from one another via the body portion 32 of the coupler portion. Optionally, first and second neck portions 34, 36 extend from each of the respective flange receiving portions and are configured to receive portions of the respective conduits inboard from the flared ends 18, 20 (away from the joint). Collectively, the inner surfaces of the flange receiving portions, the body portion, and the neck portions of the external metallic coupler define a cavity having dimensions corresponding to portions of the conduit and joined liners received within the external metallic coupler. For example, the body portion 32 has an inner diameter corresponding to an outer diameter of the joined/fused liners (which may be a larger diameter than the outside diameter of the unjoined liners and the inside diameter of the metal conduit). The first and second flange receiving portions 28, 30 have inner diameters corresponding to outer diameters of the respective first and second flared ends or stub ends 18, 20. The first and second neck portions have inner diameters corresponding to the outer diameters of the first and second conduits 11, 12.

The two portions 26a, 26b of the external metallic coupler are joined together around or encapsulate or otherwise secure the pipe joint via retention of the flared ends at the flange receiving portions. The two portions may be joined in any suitable manner, such as welded together or secured via a screw clamp.

In the illustrated embodiment shown in FIGS. 1-10, the two portions of the external metallic coupler 24 are two halves 26a, 26b which join together around the exposed portion of the joined liners and both stub ends of the conduits to resist forces pulling the two conduits apart and which could bend, sever, or otherwise damage the polymeric coupling at the joint. The metallic coupler is thus divided into the two halves 26a, 26b along a longitudinal seam (i.e., along the length of the coupler and conduit) so that one half of the coupler 24 receives one half of each conduit 11, 12, stub end 18, 20, and conduit liner 14, 16 at the respective neck portions 34, 36, flange receiving portions 28, 30, and the body portion 32. Connecting or attaching tabs 38 at each half 26a, 26b of the metallic coupler 24 extend outward from opposite sides of the cylindrical body 32 along the seam and between (and integrally formed with) the respective halves of the flange receiving portions 28, 30. The connecting tabs 38 have bores or through holes 40 so that when both halves 26a, 26b of the metallic coupler 24 are placed around the conduits 11, 12, the holes 40 align and bolts 42 may be disposed through the holes to fasten the halves together. Optionally, some of the holes may be threaded and others may be non-threaded, such that the bolts may pass through the non-threaded holes and threadably engage the threaded holes to secure the halves 26a, 26b together. Optionally, the holes may be non-threaded, such that the bolts pass through the aligned holes and are secured via a nut at the threaded end of the bolt.

Figure 1:
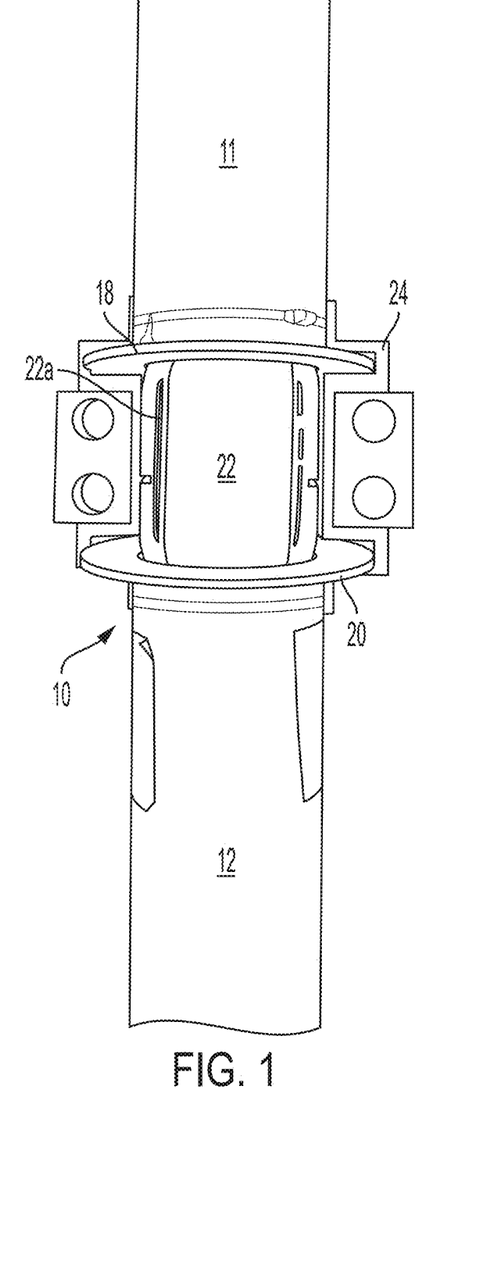
FIGS. 1-5 are cross-sectional views of two polymeric lined conduits joined together via an internal polymeric coupler and an external metallic coupler, with only one portion or half of the external metallic coupler shown.
Figure 2:
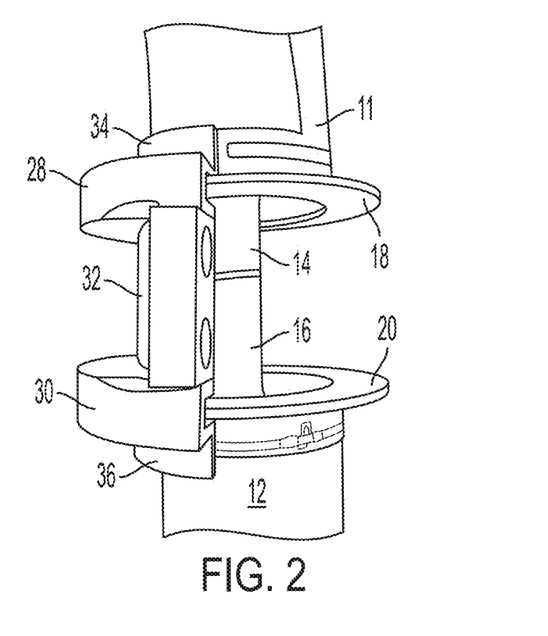
Figure 3:
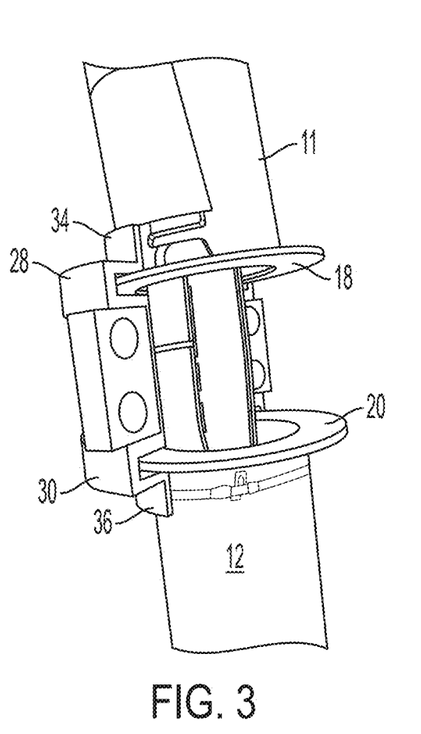
Figure 4:
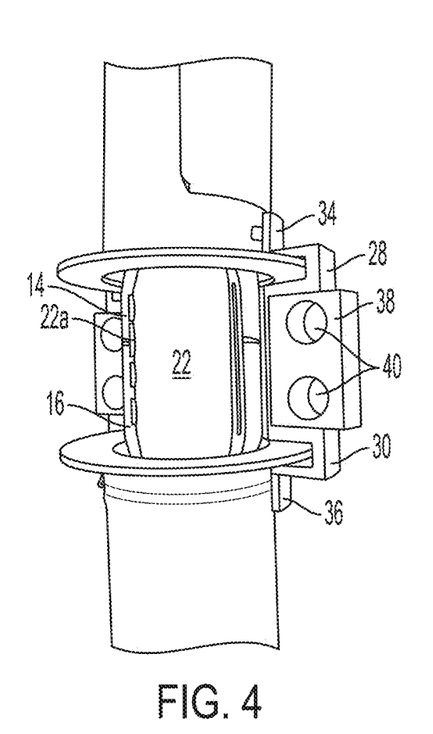
Figure 5:
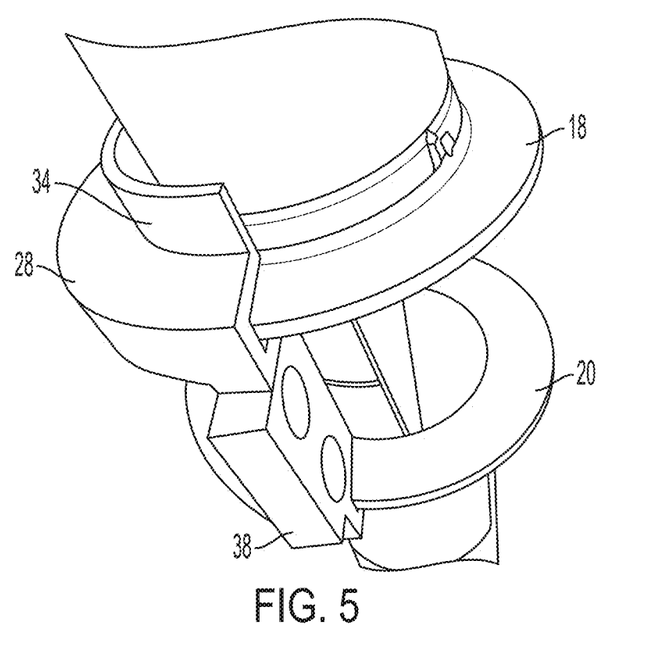
Figure 6:
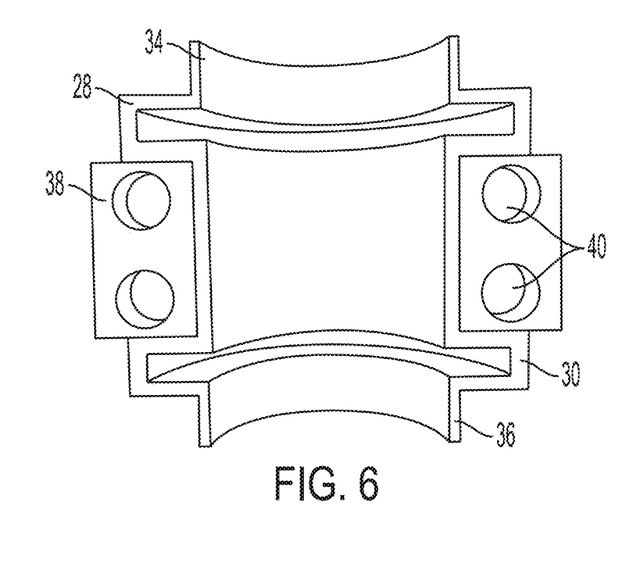
FIG. 6 is an inner plan view of the portion of the metallic coupler of FIGS. 1-5.
Figure 7:
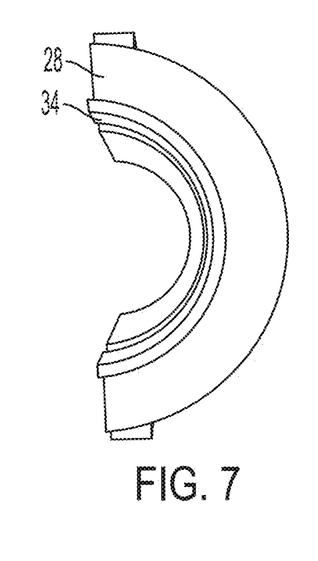
FIG. 7 is an end view of the portion of the metallic coupler of FIGS. 1-5.
Figure 8:
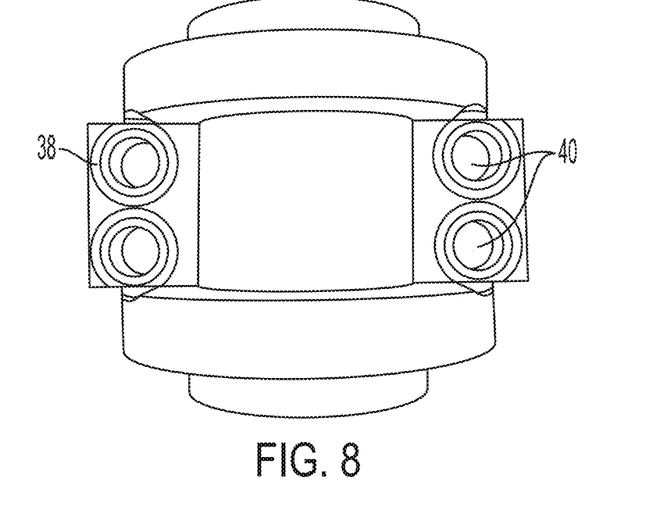
FIG. 8 is an outer plan view of the portion of the metallic coupler of FIGS. 1-5.
Figure 9:
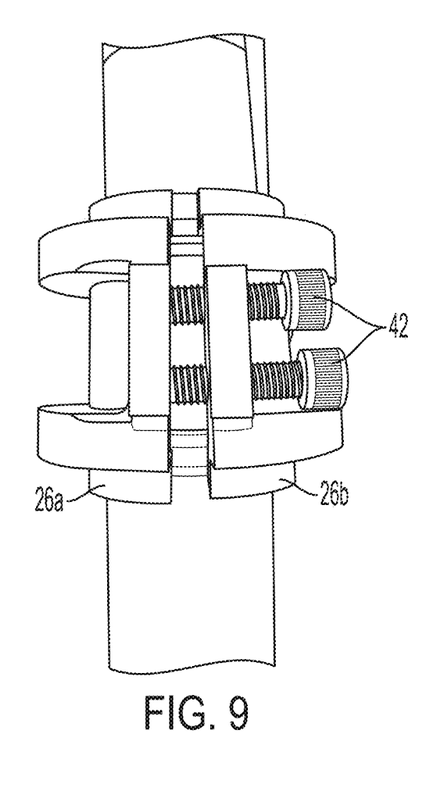
FIGS. 9 and 10 are perspective views of the conduits of FIGS. 1-5, with a second portion of the metallic coupler attached to secure the two conduits together.
Figure 10:
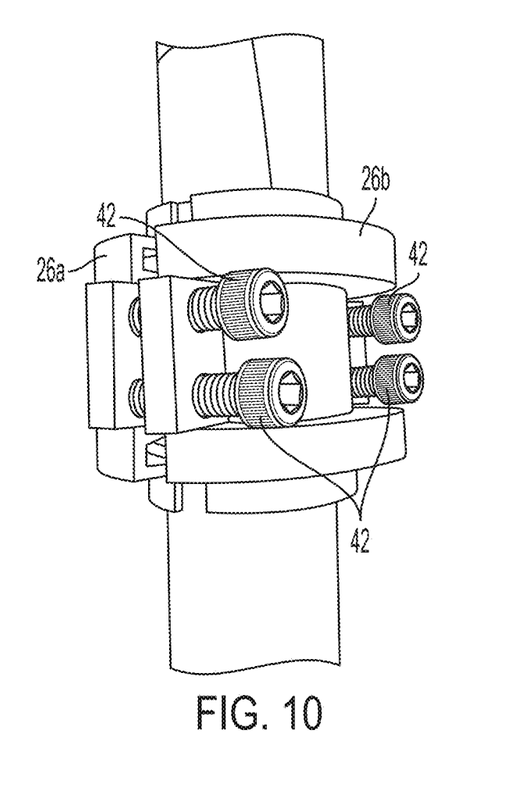
Figure 11:
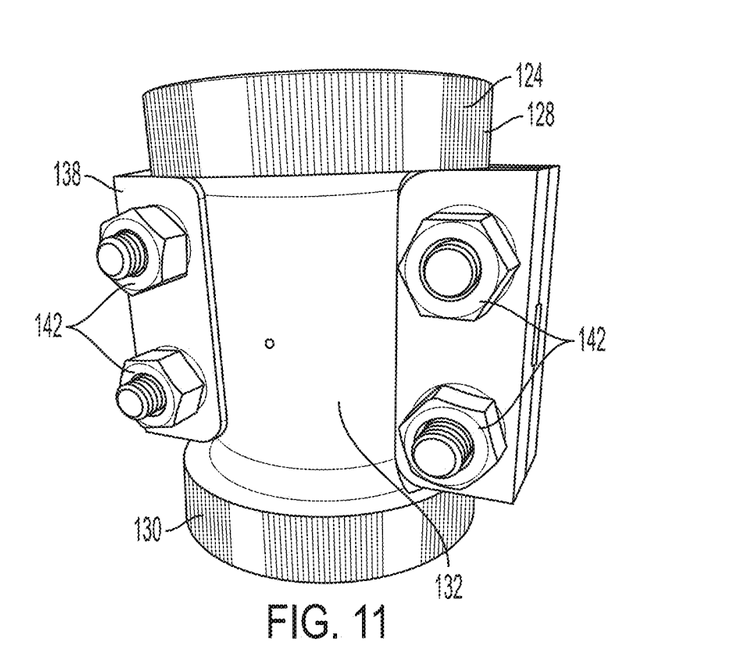
FIG. 11 is a perspective view of an external metallic coupler.
Figure 12:
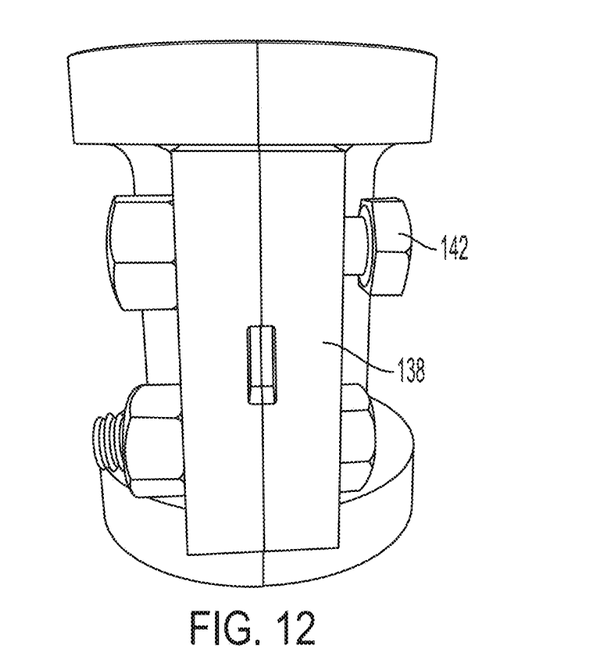
FIG. 12 is a side view of the metallic coupler of FIG. 11.
Figure 13:
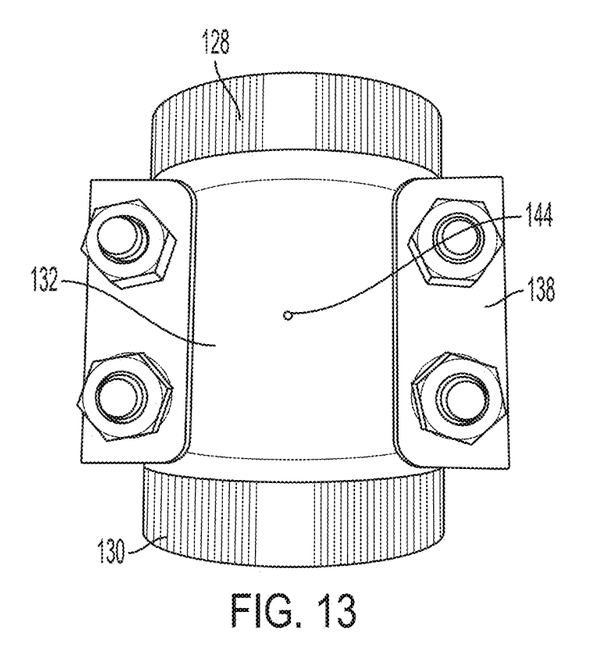
FIG. 13 is a side view of the metallic coupler of FIG. 11.
Figure 14:
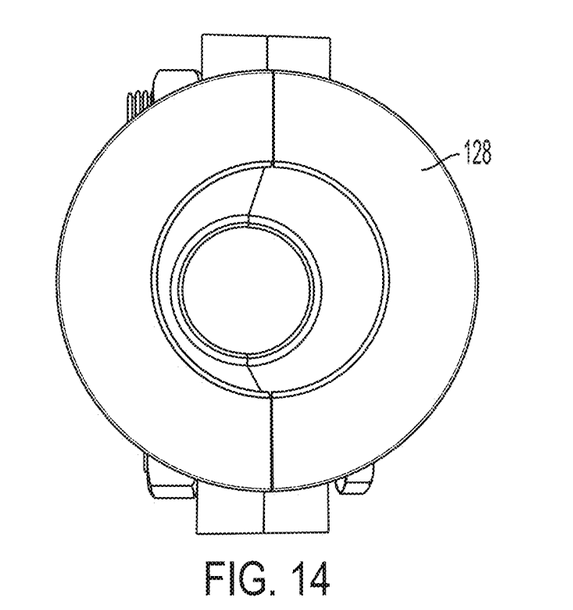
FIG. 14 is an end view of the metallic coupler of FIG. 11.
Figure 15:
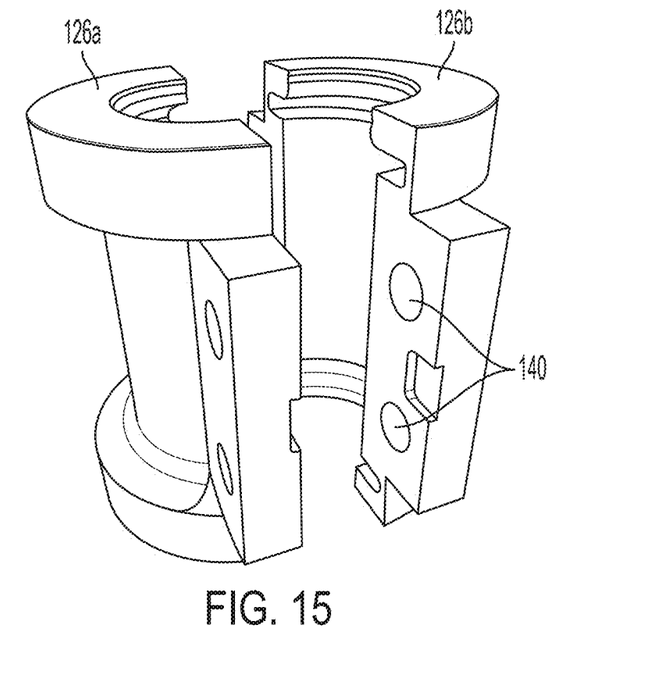
FIGS. 15 and 16 are exploded views of the metallic coupler of FIG. 11.
Figure 16:
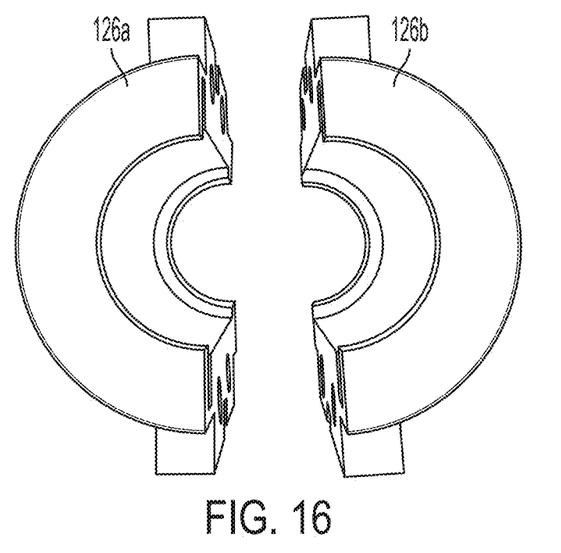

As shown in FIGS. 11-21, an external metallic coupler 124 includes first and second flange receiving portions 128, 130 spaced apart by and integrally formed with a body portion 132. The first and second neck portions 134, 136 are integrated with the first and second flange receiving portions and correspond to the smaller diameter of the conduit inboard of the flared ends. The external metallic coupler 124 also includes connecting tabs 138 on each half 126a, 126b and connecting the respective halves of the flange receiving portions 128, 130. The connecting tabs 138 have holes 140 formed therethrough and enable the joining of the two halves 126a, 126b via a fastener (e.g., nut and bolt) 142 securing the two halves together (FIGS. 11-13). Additionally, the body portion 132 includes a vent hole 144 bored through the both halves, such as to allow gas that may form between the liner and the metal pipe (such as gas that permeates the liner) or gas that may be generated during the heating/fusing of the liners (as discussed below) to escape.

Figure 17:
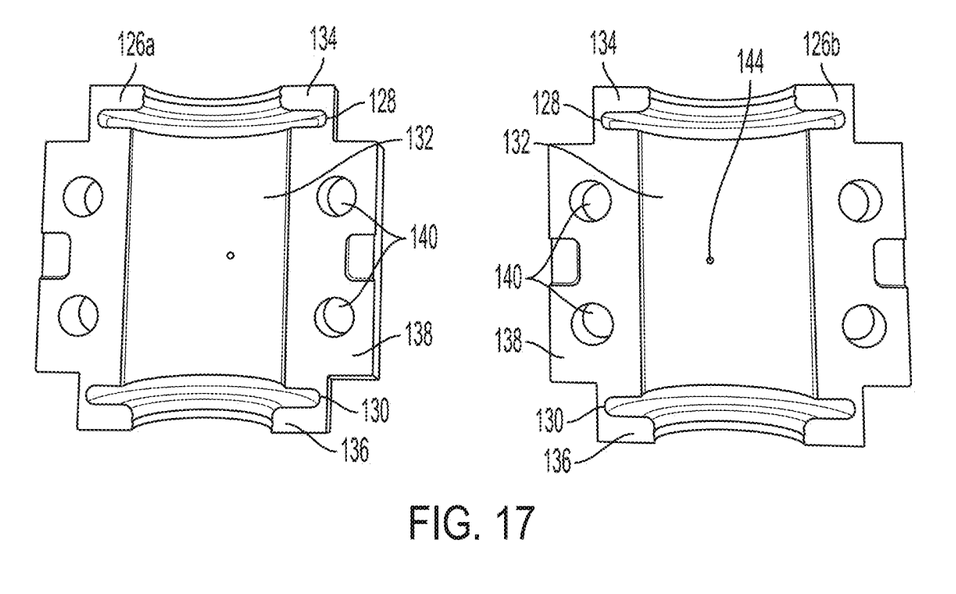
FIG. 17 is a side view of the two portions of the metallic coupler of FIG. 11, showing the inner surface of the portions of the coupler.
Figure 18:
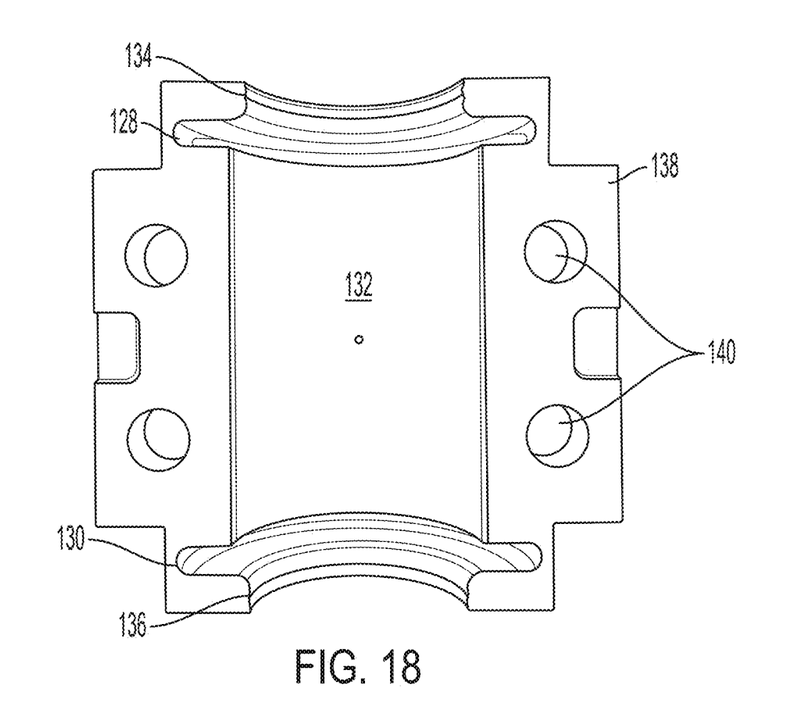
FIG. 18 is a side view of one portion of the metallic coupler of FIG. 11, showing the inner surface of the portion of the coupler.
Figure 19:
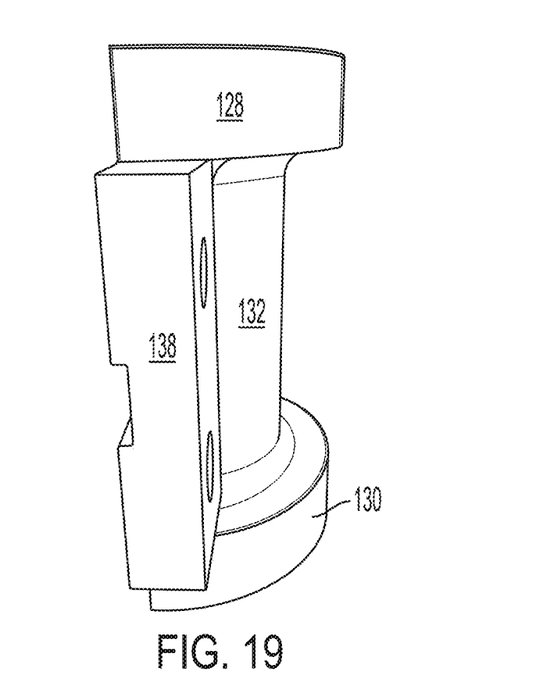
FIG. 19 is a side view of one portion of the metallic coupler of FIG. 11.
Figure 20:
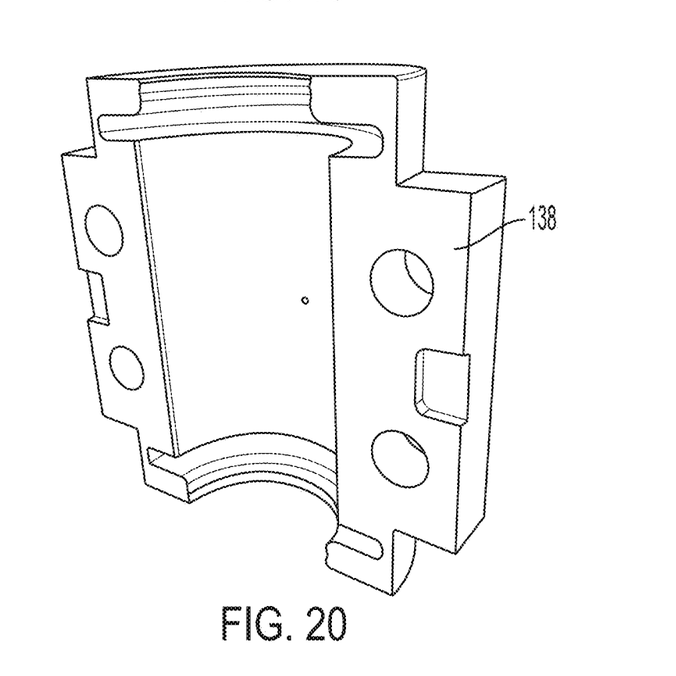
FIG. 20 is a perspective view of one portion of the metallic coupler of FIG. 11.
Figure 21:
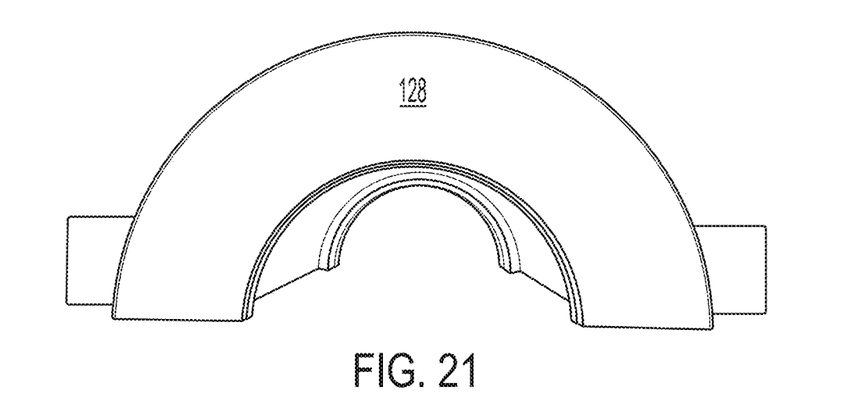
FIG. 21 is an end view of one portion of the metallic coupler of FIG. 11.

The exterior metallic coupler 124 may be dimensioned to correspond to a different conduit and/or liner joint from the metallic coupler 24. For example, the flange receiving portions 128, 130 have an inner diameter corresponding specifically to differently dimensioned flared ends than the flange receiving portions 28, 30. Additionally, where the inner diameter of the neck portions 34, 36 of the external metallic coupler 24 is substantially similar to the inner diameter of the body portion 32 (FIGS. 6 and 7), the inner diameter of the neck portions 134, 136 of the external metallic coupler 124 is smaller than the inner diameter of the body portion 132 (FIGS. 17 and 18). The external metallic coupler 24 is configured for a conduit joint 10 where the outer diameter of the conduit is substantially similar to the outer diameter of the liner joint and the external metallic coupler 124 is configured for a conduit joint 110 where the outer diameter of the conduit is less than the outer diameter of the liner joint.

Thus, the external metallic coupler may correspond to differently joined conduits and the joints of their respective liners. For example, and such as shown in FIGS. 1-5, the polymeric conduit liners 14, 16 of the conduits 11, 12 are joined together via an internal polymeric coupler 22, such that the internal coupler 22 (including a perforated metallic component 22a overmolded with polymeric material, such as described in U.S. Pub. No. 2021/0025522, incorporated above) is received in opposing ends of the respective polymeric conduit liners 14, 16 and fused to the inner surfaces of the liners when in place. The respective end portions of the polymeric liners 14, 16 (i.e., the portions of the liners that are exterior the conduits 11, 12) are flared outward to accommodate the internal coupler so that the internal diameter of the assembled conduit at the joint is consistent with the internal diameter of the conduits 11, 12. In other words, to keep the internal diameter of the liners (along which fluid would travel) consistent or uniform between the conduits to be joined and along the joint, the diameter of the portion of the liner exterior the conduit is increased to accommodate the internal coupler that is inserted into the exterior portions of the liner. When the internal coupler is inserted and fused with the respective conduit liners, the internal diameter at the joint corresponds to the internal diameter of the liner at each conduit.

As shown in FIGS. 17 and 18, the inside diameter of the body portion of the couplers 126a, 126b is larger than the inside diameter at the neck or end regions (and thus is larger than the outside diameter of the metal pipe or conduit). The fused coupler or joint may be established outside of the protruding liners or inside the protruding liners, with the outside diameter of the fused coupler and liners being greater than the outside diameter of the metal pipe or conduit, and the inside diameter of the body portion 132 of the coupler 124 generally corresponding to the outside diameter of the fused coupler.

Figure 22:
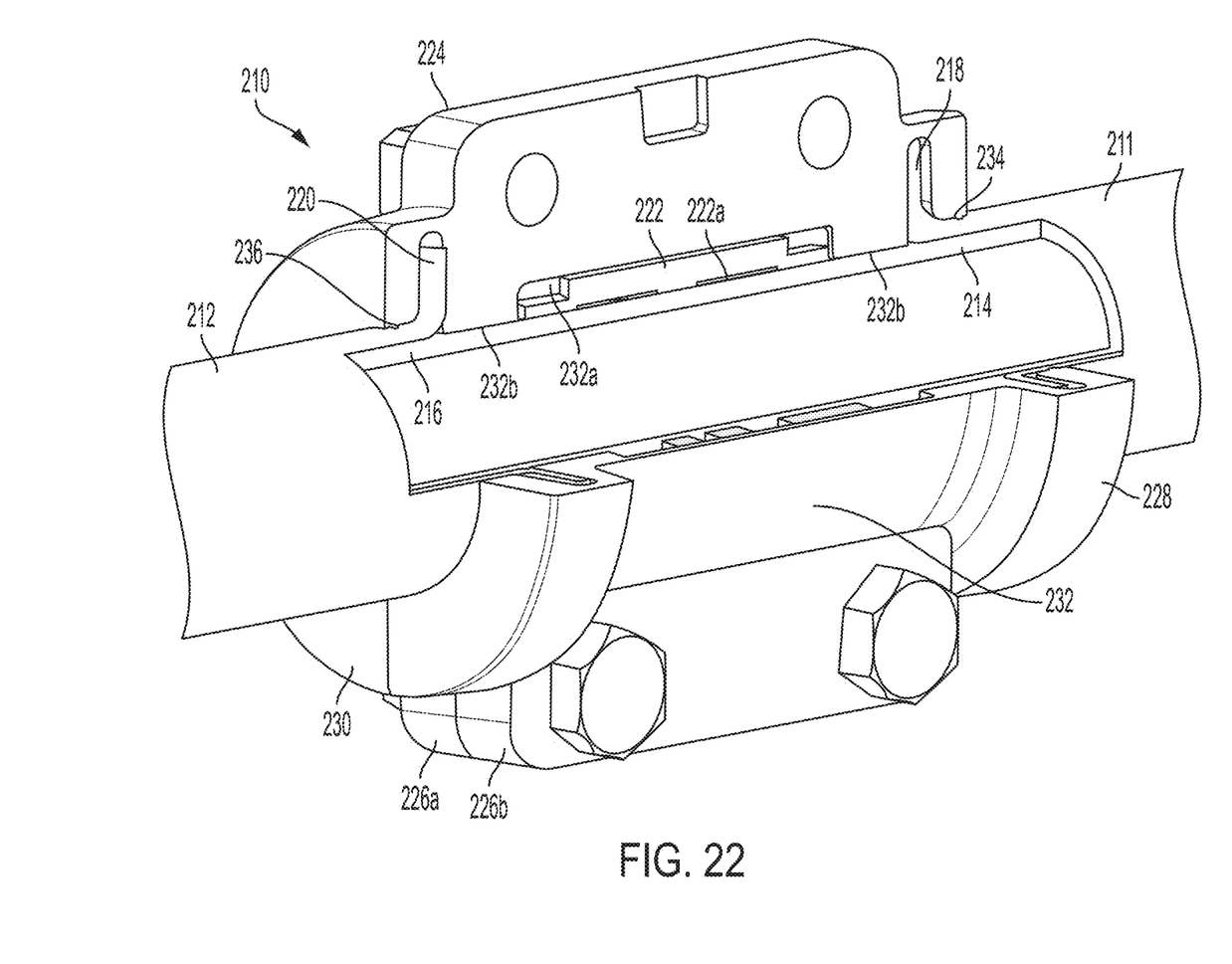
FIG. 22 is a cross-sectional view of polymeric lined conduits joined together via an external polymeric coupler and an external metallic coupler.

As shown in FIG. 22, a conduit joint 210 includes first and second liners 214, 216 joined together via an external polymeric coupler 222 (including a perforated metallic component 222a overmolded with polymeric material). In the illustrated embodiment, the liners 214, 216 protrude from respective ends of first and second conduits 211, 212 having respective first and second flared ends or stub ends 218, 220. The coupler 222 is disposed exterior the liners 214, 216 so that the liners 214, 216 are not flared radially outward and provide the consistent inside diameters within the conduits and exterior the conduits.

The external metallic coupler 224 includes a pair of portions or halves 226a, 226b, each having first and second flange receiving portions 228, 230 with internal diameters corresponding to the external diameter of the flared ends 218, 220 and first and second neck portions 234, 236 with internal diameters corresponding to the external diameter of the first and second conduits 211, 212, such as in a similar manner as described above with respect to couplers 24, 124. The body portion 232 includes an internal diameter that corresponds to the external diameter of the liner joint at the portions of the first and second liners 214, 216 protruding from the flared ends 218, 220, and includes a narrower internal diameter at or near the flange receiving portions that corresponds with the external diameter of the exposed and protruding liners. Thus, the body portion 232 includes (i) a cavity portion 232a where the internal diameter is larger than the internal diameter of the conduits 211, 212 to accommodate the external polymeric coupler 222 at the liner joint and (ii) narrowing portions 232b where the internal diameter is substantially similar to the internal diameter of the conduits 211, 212 to generally correspond to the outer diameter of the exposed protruding portions of the first and second liners.

The external polymeric coupler 222 may include a preformed coupler, meaning that the metallic component 222a is overmolded with the polymeric material prior to joining the liners 214, 216. The preformed coupler 222 receives opposing ends of the first and second liners 214, 216 so that the flared ends 218, 220 of the respective first and second conduits 211, 212 are opposing and spaced apart from one another. After the preformed coupler 222 receives the liners, the joint is formed by attaching or fusing the coupler to the liners, such as via a heating process or via adhesive.

Optionally, the external polymeric coupler may be formed and the respective liners joined at the same time. For example, a perforated metallic component may be disposed at and around the first and second liners, such as by receiving the liners in opposing ends of the metallic component or wrapped around portions of the first and second liners while the liners are aligned so that the stub ends of the metal conduit are opposing and spaced from one another. A layer of polymeric material may then be disposed at the metallic component and the external polymeric coupler may be formed as it is fused with the liners. In other words, the heating process may both overmold the polymeric layer of the coupler to the metallic component and fuse the polymeric material of the coupler to the liner. Optionally, the polymeric material of the coupler may be injection molded and overmolded around and through the perforated metallic element to form the coupler at the exposed protruding ends of the liners, and the coupler may then be heated to fuse the coupler with the exposed protruding ends of the liners.

The heating process may occur before the external metallic coupler is placed at the conduit joint so that the liner joint is formed prior to securing the conduit joint. Optionally, the injection molding process and/or the heating process may occur after the external metallic coupler is placed at the conduit joint so that the liner joint is formed or secured after the external metallic coupler is placed at the joint. For example, a preformed external metallic coupler may receive opposing ends of first and second polymeric liners so that respective flared ends of first and second conduits are opposing and spaced apart from one another. Then, an external metallic coupler may be placed at the joint and the entire assembly may undergo the heating process so that the external polymeric coupler fuses with and joins together the first and second pipe liners while within the cavity of the external metallic coupler. The vent hole formed in the body portion of the external coupler allows heat and gas to escape the external coupler during the heating process.

Thus, the coupling system provides a secure connection or joint between two opposed and spaced apart stub ends of a lined metal pipe. The liners may be joined via a fused coupler or other suitable means, and a metallic coupler is attached at the stub ends to secure the stub ends relative to one another in spaced apart relationship to one another, with the joined/fused liners disposed between the spaced apart stub ends and protected and secured via the metal coupler.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A conduit joint system securing ends of two conduits together, the conduit joint system comprising:
   a first conduit having a first flared end and a first liner protruding from the first flared end;
   a second conduit having a second flared end and a second liner protruding from the second flared end;
   wherein the first and second liners are joined together so that, with the first and second liners joined together, the first and second flared ends are opposing and spaced apart from one another and portions of the first and second liners are disposed between the first and second flared ends;
   an external coupler that is configured to receive the first and second flared ends opposing and spaced apart from one another;
   wherein the external coupler comprises (i) a first flange receiving portion configured to receive the first flared end, (ii) a second flange receiving portion configured to receive the second flared end, and (iii) a body portion extending between the first and second flange receiving portions and configured to receive the portions of the first and second liners disposed between the first and second flared ends;
   wherein, with the first and second liners joined together and with the external coupler receiving the first flared end, the second flared end, and the portions of the first and second liners disposed between first and second flared ends, the external coupler secures the first and second conduits together; and
   wherein the first and second liners are joined together via an internal coupler received in opposing ends of the first and second liners.

2. The conduit joint system of claim 1, wherein the first and second liners comprise a polymeric material.

3. The conduit joint system of claim 2, wherein the internal coupler comprises a perforated metallic component overmolded with a polymeric material, and wherein the polymeric material of the first and second liners is fused with the polymeric material of the internal coupler to join together the first and second liners.

4. The conduit joint system of claim 1, wherein the portions of the first and second liners protruding from the respective first and second flared ends have outer diameters that are larger than inner diameters of the respective first and second conduits.

5. The conduit joint system of claim 1, wherein the external coupler comprises a first coupler element and a second coupler element, and wherein the first and second coupler elements are joined together to secure the first and second conduits together.

6. The conduit joint system of claim 5, wherein the first and second coupler elements of the external coupler each receive respective first and second portions of the first flared end, the second flared end, and the first and second liners between the first and second flared ends.

7. The conduit joint system of claim 5, wherein the first and second coupler elements of the external coupler are joined together via one selected from the group consisting of (i) one or more bolts, (ii) welding, and (iii) a screw clamp.

8. The conduit joint system of claim 1, wherein the first flange receiving portion comprises an inner diameter corresponding to an outer diameter of the first flared end, the second flange receiving portion comprises an inner diameter corresponding to an outer diameter of the second flared end, and the body portion comprises an inner diameter corresponding to an outer diameter of the portions of the first and second liners disposed between the first and second flared ends.

9. The conduit joint system of claim 8, wherein the inner diameter of the body portion is larger than inner diameters of the respective first and second conduits to accommodate the portions of the first and second liners disposed between the first and second flared ends.

10. The conduit joint system of claim 1, wherein the first and second liners are joined together before the external coupler secures the first and second conduits together.

11. The conduit joint system of claim 1, wherein the first and second liners are joined together after the external coupler secures the first and second conduits together.

12. The conduit joint system of claim 1, wherein the first and second conduits comprise metallic pipes, and wherein the first and second liners comprise a polymeric material.

13. The conduit joint system of claim 12, wherein the first and second flared ends comprise stub ends.

14. The conduit joint system of claim 13, wherein the stub ends are cold formed with the respective first and second conduits.

15. The conduit joint system of claim 13, wherein the stub ends are welded to the respective first and second conduits.

16. The conduit joint system of claim 1, wherein the body portion of the external coupler comprises a vent hole.

17. A conduit joint system securing ends of two or more conduits together, the conduit joint system comprising:
   a first conduit having a first flared end and a first liner protruding from the first flared end;
   a second conduit having a second flared end and a second liner protruding from the second flared end;
   wherein the first and second liners are joined together so that, with the first and second liners joined together, the first and second flared ends are opposing and spaced apart from one another and portions of the first and second liners are disposed between the first and second flared ends;
   an external coupler that is configured to receive the first and second flared ends opposing and spaced apart from one another;
   wherein the external coupler comprises a first coupler element and a second coupler element, and wherein the first and second coupler elements each respectively comprise (i) a first flange receiving portion configured to receive a respective portion of the first flared end, (ii) a second flange receiving portion configured to receive a respective portion of the second flared end, and (iii) a body portion extending between the first and second flange receiving portions and configured to receive respective portions of the first and second liners disposed between the first and second flared ends;

wherein the respective first flange receiving portions of the first and second coupler elements each comprise an inner diameter corresponding to an outer diameter of the first flared end, the respective second flange receiving portions of the first and second coupler elements each comprise an inner diameter corresponding to an outer diameter of the second flared end, and the respective body portions of the first and second coupler elements each comprise an inner diameter corresponding to an outer diameter of the portions of the first and second liners disposed between the first and second flared ends;

wherein, with the first and second liners joined together and with the external coupler receiving the first flared end, the second flared end, and the portions of the first and second liners disposed between first and second flared ends, the first and second coupler elements are joined together to secure the first and second conduits together; and wherein the first and second liners are joined together via an internal coupler received in opposing ends of the first and second liners.

18. The conduit joint system of claim 17, wherein the first and second liners are joined together via an internal coupler received in opposing ends of the first and second liners and wherein the internal coupler comprises a perforated metallic component overmolded with a polymeric material, and wherein the polymeric material of the first and second liners is fused with the polymeric material of the internal coupler to join together the first and second liners.

19. The conduit joint system of claim 17, wherein the inner diameters of the respective body portions of the first and second coupler elements are larger than inner diameters of the respective first and second conduits to accommodate the portions of the first and second liners disposed between the first and second flared ends.

\* \* \* \* \*

UNITED STATES PATENT AND TRADEMARK OFFICE
CERTIFICATE OF CORRECTION

| | |
|---|---|
| PATENT NO. | : 12,297,938 B2 |
| APPLICATION NO. | : 17/806087 |
| DATED | : May 13, 2025 |
| INVENTOR(S) | : Ronald V. Andronaco |

Page 1 of 1

It is certified that error appears in the above-identified patent and that said Letters Patent is hereby corrected as shown below:

In the Claims

<u>Column 10</u>
Claim 18, Lines 8-10, Delete "wherein the first and second liners are joined together via an internal coupler received in opposing ends of the first and second liners and" after "The conduit joint system of claim 17,"

Signed and Sealed this
Tenth Day of June, 2025

Coke Morgan Stewart
*Acting Director of the United States Patent and Trademark Office*